Dec. 12, 1967   G. O. HUNTZINGER   3,357,415
CAPACITOR DISCHARGE IGNITION SYSTEM
Filed Oct. 7, 1965   2 Sheets-Sheet 1

INVENTOR.
Gerald O. Huntzinger
BY C.R. Meland
His Attorney

Dec. 12, 1967  G. O. HUNTZINGER  3,357,415
CAPACITOR DISCHARGE IGNITION SYSTEM
Filed Oct. 7, 1965  2 Sheets-Sheet 2

INVENTOR.
Gerald O. Huntzinger
BY
C. R. Meland
His Attorney

United States Patent Office 3,357,415
Patented Dec. 12, 1967

3,357,415
CAPACITOR DISCHARGE IGNITION SYSTEM
Gerald O. Huntzinger, Anderson, Ind., assignor to General Motors Corporation, Detroit, Mich., a corporation of Delaware
Filed Oct. 7, 1965, Ser. No. 493,723
5 Claims. (Cl. 123—148)

ABSTRACT OF THE DISCLOSURE

This invention relates to a capacitor discharge ignition system for an internal combustion engine. An inductor is provided which is connected in series with a source of direct current through a switching device such as the breaker contacts of a distributor. When the switching device opens, the energy developed in the inductor is transferred to a capacitor. The capacitor discharges through another switching device such as a contolled rectifier and the primary winding of an ignition coil. The point of discharge of the capacitor is timed such that it discharges when it reaches its peak voltage. This is accomplished by connecting the gate of the controlled rectifier to a circuit connecting the inductor and the capacitor and the reversal of current in this circuit when the capacitor becomes completely charged gates the controlled rectifier conductive.

---

This invention relates to an ignition system for an internal combustion engine and more particularly to an igition system of the capacitor discharge type where the energy stored in a capacitor is used to fire the spark plugs of the engine.

One of the objects of this invention is to provide a capacitor discharge ignition system which can be energized from a low voltage source commonly found on motor vehicles such as a twelve volt storage battery.

Another object of this invention is to provide a capacitor discharge ignition system that can be applied to conventional induction ignition systems.

Still another object of this invention is to provide a capacitor discharge type of ignition system where the capacitor is discharged at the instant of peak energy storage in the capacitor.

A further object of this invention is to provide a condenser discharge ignition system where energy is transferred to the condenser from an inductor and where the condenser discharges to provide spark firing energy when the current flow reverses in the inductor. This insures an arrangement where the condenser is discharged at the instant of peak energy storage in the condenser.

A further object of this invention is to provide a condenser discharge type of ignition system where the beginning of the discharge of the condenser is controlled by a switching device that is triggered into conduction just as the condenser begins to discharge.

Further objects and advantages of the present invention will be apparent from the following description, reference being had to the accompanying drawings wherein preferred embodiments of the present invention are clearly shown.

Figure 1:
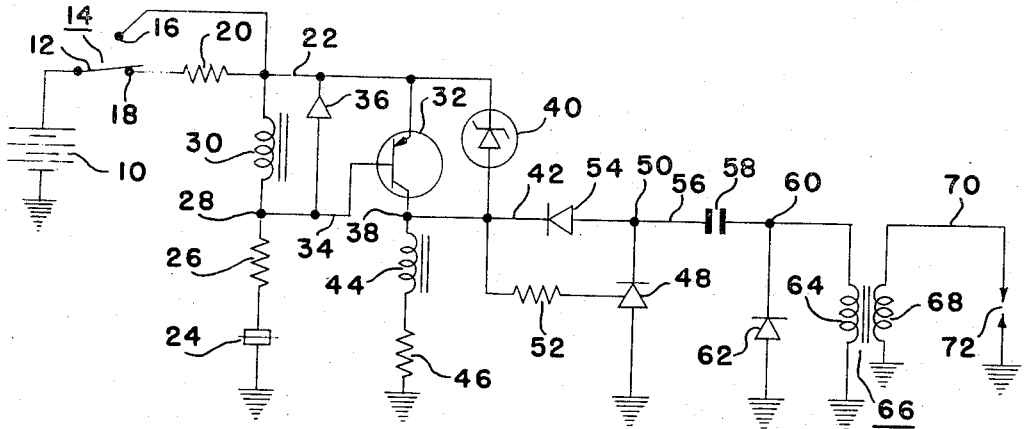
FIGURE 1 is a schematic circuit diagram of an ignition system made in accordance with this invention.

Referring now to the drawings and more particularly to FIGURE 1, reference numeral 10 designates a source of direct current such as a storage battery on a motor vehicle.

The negative side of the source of direct current is grounded while the positive side is connected with a contact 12 of a control switch 14. The control switch has contacts 16 and 18. The contact 16 is used when the engine is being cranked to start the engine while the contact 18 is used when the engine is running. When the contact 12 engages the contact 16, a resistor 20 is by-passed which is connected between fixed contact 18 and a power supply conductor 22.

The ignition system of this invention is controlled by breaker contacts 24 of a conventional distributor which is not illustrated. These breaker contacts, as are well known to those skilled in the art, open and close in synchronism with operation of the engine when the shaft of the distributor is driven by the cam shaft of the engine. One side of the pair of breaker contacts is grounded while the opposite side of the breaker contacts are connected with a resistor 26. The opposite side of the resistor 26 is connected with junction 28 and an inductor 30 connects the junction 28 and the power supply conductor 22.

The igition system shown in FIGURE 1 has a PNP transistor 32. The emitter of this transistor is connected with conductor 22 while the base of this transistor is connected with conductor 34. A diode 36 is connected across the emitter and base electrodes of the transistor 32 and in parallel with the inductor 30. The collector of transistor 32 is connected with a junction 38. The emitter and collector electrodes of transistor 32 are shunted by a Zener diode 40.

The junction 38 is connected with a conductor 42 and is connected to one side of an energy storing inductor 44. A resistor 46 connects the opposite side of the inductor 44 to ground.

The ignition system shown in FIGURE 1 includes a silicon controlled rectifier 48. The anode of controlled rectifier 48 is grounded while the cathode is connected with junction 50. The gate of controlled rectifier 48 is connected with conductor 42 through a resistor 52. A diode 54 is connected between conductor 42 and junction 50 on conductor 56.

The condenser for the ignition system of FIGURE 1 is designated by reference numeral 58. This condenser is connected between junctions 50 and 60. A diode 62 is connected between junction 60 and ground. The junction 60 is also connected to one side of the primary winding 64 of an output transformer or ignition coil generally designated by reference numeral 66. The opposite side of the primary 64 is grounded as shown.

The secondary winding 68 of the ignition transformer has one side connected to ground and an opposite side to a high voltage conductor 70 which feeds the spark plug of the engine. The spark plugs are fed through the rotor contact and distributor cap of a conventional distributor but for simplicity of description, the conductor 70 is shown directly connected with one of the spark plugs 72. It will be understood, however, that there will be as many spark plugs as there are cylinders for the engine and that the high voltage conductor 70 feeds all of the spark plugs through a conventional rotor and distributor cap.

The operation of the ignition system shown in FIGURE 1 will now be described. When the internal combustion engine is running or when it is being cranked, the breaker contacts 24 open and close in synchronism with operation of the engine. When the breaker contacts 24 are closed, a forward bias is applied to the transistor 32 which causes it to conduct in its emitter-collector circuit. When breaker contacts 24 are open, the base circuit for transistor 32 is opened and the transistor 32 therefrom is biased to a nonconductive condition in its emitter-collector circuit. It therefore is seen that transistor 32 is turned on when the breaker points 24 are closed and is turned off when the breaker points 24 are opened.

When transistor 32 is conductive in its emitter-collector circuit, current can flow from the positive side of the direct current source 10, through switch contact 12, through conductor 22, through the emitter-collector circuit of transistor 32, through inductor 44 and through resistor 46 to ground. When the breaker contacts 24 open and transistor 32 turns off, the circuit to the inductor 44 is broken. The energy stored in inductor 44 will now be transferred to the condenser 58, through a circuit that includes resistor 46, diode 62, capacitor 58, diode 54 and then back to the opposite side of the inductor 44. When all of the energy stored in the inductor 44 has been transferred to the condenser 58 to charge the condenser, the current in the circuit just described will attempt to reverse its direction by virtue of the voltage developed across the condenser 58. This attempted reversal of current flow is blocked by diodes 54 and 62, however, and the reversed current therefore flows from capacitor 58, through the primary 64 of ignition coil 66, through the resistor 46, through inductor 44, through resistor 52, and then through the gate-cathode circuit of the controlled rectifier 48. This biases the controlled rectifier 48 to a conductive condition in its anode-cathode circuit and the condenser 58 will now suddenly discharge through a circuit that includes the primary winding 64 of the ignition coil and the anode-cathode circuit of the controlled rectifier 48. Thus a very small current through the gate-cathode circuit of the controlled rectifier 48 which is developed immediately after the inductor 44 transfers its energy to capacitor 58, causes the controlled rectifier 48 to turn on and causes a complete discharge of the capacitor 58. When the capacitor 58 discharges through the primary winding 64, an ignition pulse is developed in the secondary winding 68 which is applied to one of the spark plugs 72.

It is pointed out that certain components of the system of FIGURE 1 need only be added to a conventional inductive type of ignition system to convert it to the capacitor discharge type of ignition system of this invention. Thus in a conventional inductive type of ignition system, the transistor 32 would be connected directly in series with the primary winding 64 of the ignition coil and by the addition of the other capacitor discharge circuit elements in FIGURE 1, it is possible to convert an inductive type of ignition system to a capacitor discharge type of ignition system.

Figure 2:
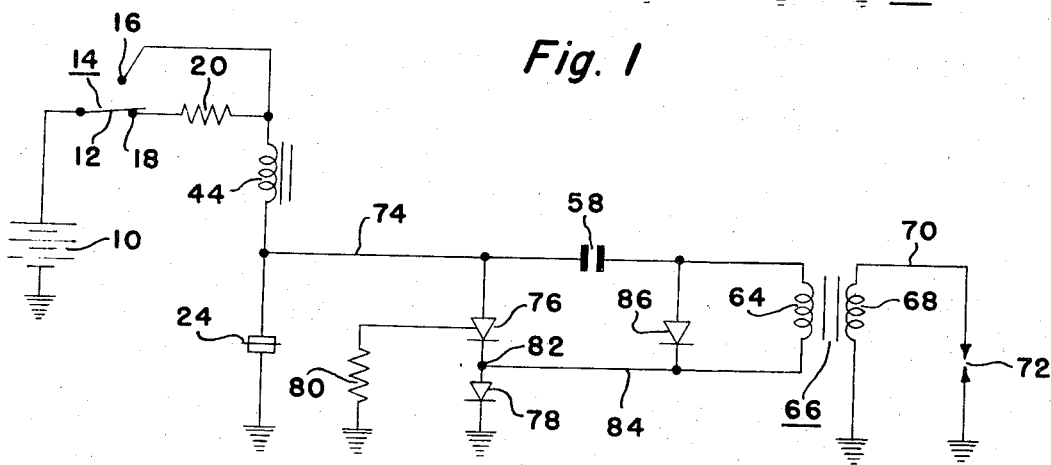
FIGURE 2 is a schematic circuit diagram of a modification of the ignition system shown in FIGURE 1.

Referring now to FIGURE 2, a modified ignition system made in accordance with this invention is illustrated. The same reference numerals have been used in FIGURES 1 and 2 to identify the same components in each figure.

In FIGURE 2, the breaker contacts 24 are connected in series with the inductor 44 rather than controlling a transistor as in the system of FIGURE 1. The inductor 44 and the breaker contacts 24 are connected across the source of direct current 10. In FIGURE 2, the condenser 58 is connected between one side of the primary 64 and a conductor 74. A circuit is connected between conductor 74 and ground which includes the anode-cathode circuit of controlled rectifier 76 and a diode 78. A resistor 80 connects the gate of controlled rectifier 76 to ground. The opposite side of the primary winding 64 is connected to junction 82 via a conductor 84. A diode 86 is connected across the primary winding 64 of the ignition coil.

In the system of FIGURE 2, the capacitor 58 will be charged from the energy stored in the inductor 44 when the breaker contacts 24 open. The capacitor will be charged through a circuit that includes diodes 86 and 78, the source of direct current 10 and the switch 14. As the current reverses in this circuit after capacitor 58 is charged, this current will flow through conductor 74, inductor 44, power source 10, through resistor 80, through the gate-cathode circuit of controlled rectifier 76, through conductor 84, and then through primary winding 64 to an opposite side of capacitor 58. This small reverse current turns the controlled rectifier 76 on and the condenser 58 now abruptly discharges through controlled rectifier 78 and the primary winding 64. This causes a voltage to be induced in secondary winding 68 which causes one of the spark plugs 72 to fire.

Figure 3:
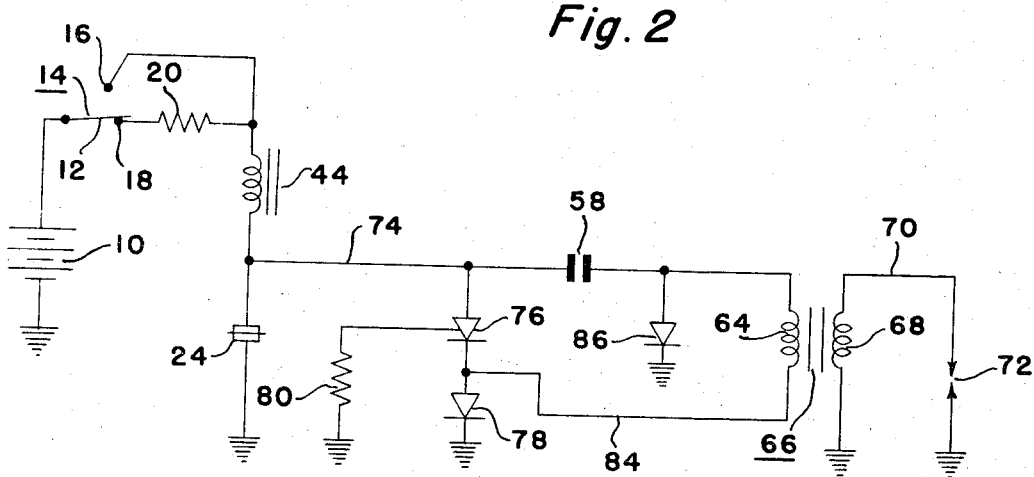
FIGURE 3 is a schematic circuit diagram of a modification of the system shown in FIGURE 2.

The system of FIGURE 3 is substantially identical with the system of FIGURE 2 with the exception that one end of diode 86 is grounded rather than being connected to conductor 84. The operation of the system of FIGURE 3 is identical with the operation of the system of FIGURE 2 with the exception that during the polarity reversal of the primary winding 64 after the discharge of capacitor 58, the controlled rectifier 76 is maintained turned on by current flow through diode 86, resistor 80 and the gate-cathode circuit of controlled rectifier 76. This means that current can begin to flow in inductor 44 through controlled rectifier 76 before breaker contacts 24 reclose to insure a maximum on-time inductor 44.

Figure 4:
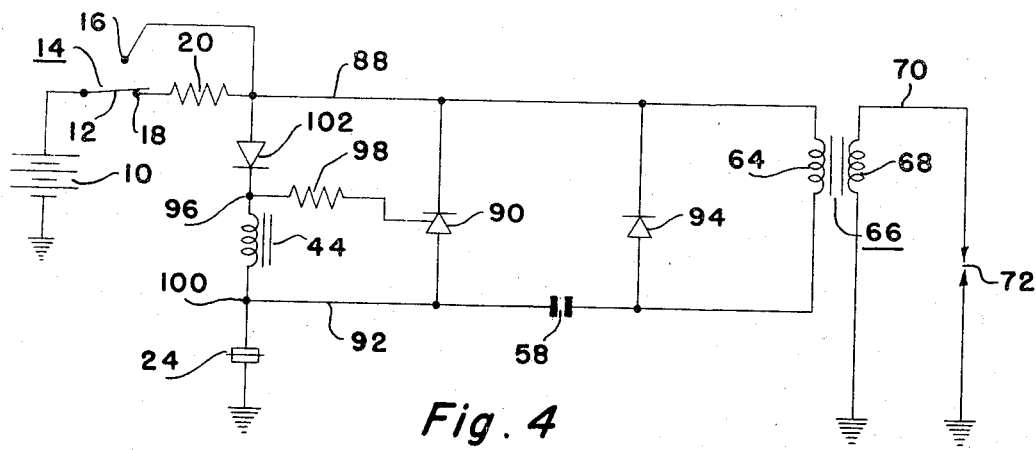
FIGURE 4 is a schematic circuit diagram of a condenser discharge ignition system in which a current reversal in an inductor triggers the discharge of the condenser.

Referring now to FIGURE 4, another modified capacitor discharge ignition system is illustrated. The same reference numerals have been used in FIGURES 1 and 4 to identify the same component parts in each figure. In FIGURE 4, the conductor 88 is the power input conductor and a controlled rectifier 90 is connected between this conductor and conductor 92. The condenser 58 is connected between the anode of controlled rectifier 90 and the anode of a diode 94 which is connected across primary winding 64. The gate of controlled rectifier 90 is connected with junction 96, through a resistor 98. The inductor 44 is connected between junctions 96 and 100 and the breaker points 24 are connected between junction 100 and ground. A diode 102 is connected between conductor 88 and junction 96.

In the system of FIGURE 4, current will flow through the inductor 44 whenever the breaker contacts 24 are closed. When the breaker contacts 24 open, energy is transferred to capacitor 58, through conductor 92, capacitor 58, diode 94, conductor 88 and diode 102. As the current reverses as when capacitor 58 becomes charged, the controlled rectifier 90 is triggered to a conductive condition by current flow from capacitor 58, through conductor 92, through inductor 44, through resistor 98, through the anode-cathode circuit of controlled rectifier 90, and then through the primary winding 64. As soon as controlled rectifier 90 is triggered to a conductive condition, the capacitor 58 will discharge through controlled rectifier and through primary winding 64.

The system of FIGURE 4 reduces the likelihood of false operation due to breaker contact arcing.

Figure 5:
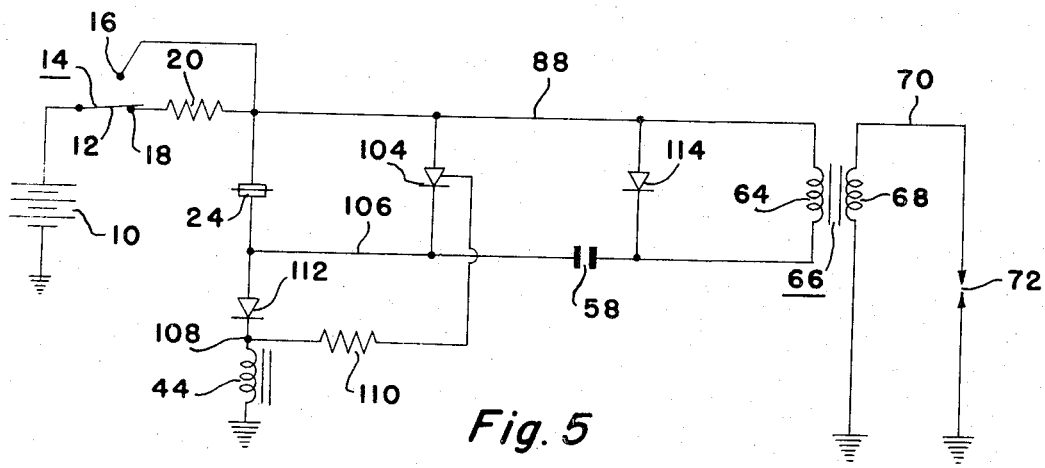
FIGURE 5 is a schematic circuit diagram of a modification of the system shown in FIGURE 4.

Referring now to FIGURE 5, a system is illustrated which is a modified version of the system shown in FIGURE 4 and which is capable of increasing the on time of current build-up in inductor 44. In FIGURE 5, the anode-cathode circuit of controlled rectifier 104 is connected between conductors 88 and 106. The gate of controlled rectifier 104 is connected with junction 108 through a resistor 110. The inductor 44 is connected between junction 108 and ground. The breaker contacts 24 in FIGURE 5 are connected between conductor 88 and conductor 106. A diode 112 is connected between conductor 106 and junction 108. The condenser 58 in FIGURE 5 is connected between the cathode of diode 114 and the cathode of controlled rectifier 104.

In the system of FIGURE 5, current will flow through the inductor 44 whenever the breaker contacts 24 are closed. When the breaker contacts 24 open, energy is transferred to the capacitor 58 from the inductor 44 via a circuit that is through power source 10, switch 14, conductor 88, diode 114, capacitor 58, conductor 106 and then through diode 112 to an opposite side of the inductor 44. As the current reverses in this circuit, the controlled rectifier 104 will be biased to a conductive condition by current flow through resistor 110, the gate cathode circuit of controlled rectifier 104, capacitor 58, primary winding 64, conductor 88, switch 14, power source 10, and back to the opposite side of the inductor 44. This turns on the controlled rectifier 104 so that capacitor 58 can now abruptly discharge through primary winding 64 to cause an ignition pulse to be developed in secondary winding 68.

It will be observed that with the system of FIGURE 5 like the system of FIGURE 3, the controlled rectifier when switched to a conductive condition not only serves as a discharge path for capacitor 58 but also establishes a circuit for the inductor 44 before the breaker contacts 24 reclose. This provides a maximum on time for building up energy in the inductor 44.

Figure 6:
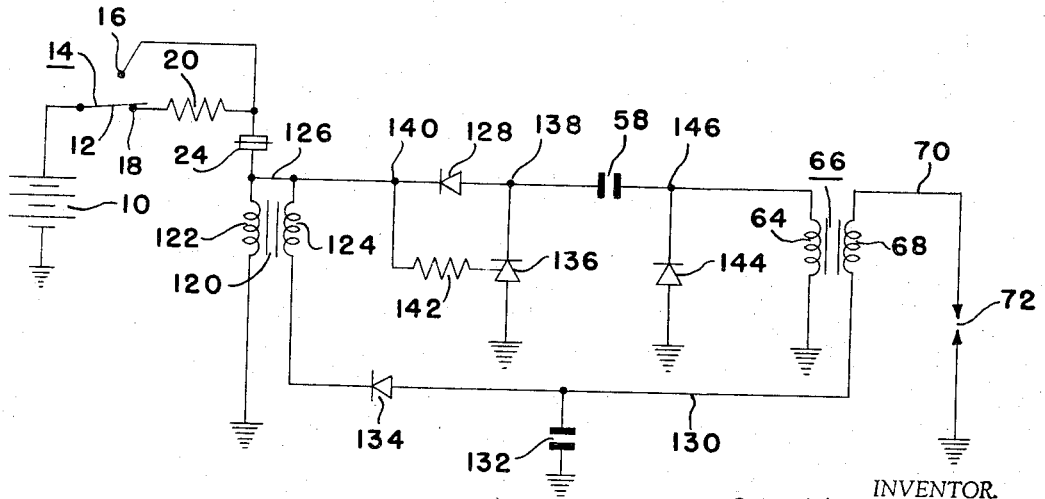
FIGURE 6 is a modified version of the ignition system shown in FIGURE 1 which uses an energy boosting capacitor.

Referring now to FIGURE 6, a modified condenser discharge ignition system is illustrated which uses a transformer and an energy boosting capacitor. In the system of FIGURE 6, a transformer 120 is employed which has a primary winding 122 and a secondary winding 124. One side of the primary winding 122 is grounded and the opposite side of the primary winding 122 is connected with conductor 126. The conductor 126 is connected to the power source through the breaker contacts 24.

A diode 128 is connected between conductor 126 and the main discharge capacitor 58. The opposite side of capacitor 58 is connected with the primary 64 of ignition transformer 66. One side of the secondary winding 68 of transformer 66 is connected to high voltage leads 70 and the opposite side is connected with a conductor 130.

An auxiliary energy boosting capacitor 132 is connected between conductor 130 and ground. A diode 134 is connected between conductor 130 and the secondary 124 of transformer 120.

The system of FIGURE 6 utilizes a controlled rectifier 136 which has its anode grounded. The cathode of controlled rectifier 136 is connected with junction 138 while the gate is connected with junction 140 via resistor 142. A diode 144 connects junction 146 to ground.

In the ignition system of FIGURE 6, energy is transferred to the capacitor 58 from the primary winding 122 as the breaker contacts 24 open and close the circuit through the primary winding. When the breaker contacts open, the capacitor is charged from primary winding 122 by a circuit that can be traced from the grounded end of primary winding 122, through diode 144, through capacitor 58, through diode 128 and then to the opposite side of primary winding 122. When the breaker contacts open, the auxiliary booster capacitor 132 is charged from secondary winding 124 through a circuit that can be traced from conductor 126, through primary winding 122, through capacitor 132, and then through diode 134 to the opposite side of the secondary winding 124.

When the current reverses in the circuit connecting primary winding 122 and capacitor 58, the controlled rectifier 136 is triggered to a conductive condition by current flow through primary 64, through primary winding 122, through conductor 126, through junction 140, through resistor 142, through the gate-cathode circuit of controlled rectifier 136 to the opposite side of capacitor 58. When controlled rectifier 136 turns on in its anode-cathode circuit, the capacitor 58 suddenly discharges completely through primary 64 and the anode-cathode circuit of controlled rectifier 136. As a result, a voltage is induced in secondary winding 68 to fire the spark plug 72 and the auxiliary capacitor 132 will now discharge through secondary 68 and the spark plug 72.

The FIGURE 6 systems differs from the other systems of this invention in the provision of the booster capacitor 132 which discharges through the spark plug to supply additional energy once the main capacitor 58 discharges.

While the embodiments of the present invention as hereing disclosed constitute a preferred form, it is to be understood that other forms might be adopted.

What is claimed is as follows:

1. An ignition system for an internal combustion engine comprising, an ignition coil having a primary winding and a secondary winding, said secondary winding being adapted to be connected with a spark plug of said internal combustion engine, a source of direct current, an inductor, a first switching means operative to periodically connect and disconnect said source of direct current and said inductor, a capacitor, a charging circuit connecting said capacitor and said inductor, the energy developed in said inductor when said switching means is opened being transferred to said capacitor through said charging circuit, a second switching device having current carrying terminals and a control terminal, the current carrying terminals of said second switching device being connected in series with said capacitor and with the primary winding of said ignition coil whereby said capacitor discharges through said second switching device and through the primary winding of said ignition coil when said second switching device is biased to a conductive condition, and a control circuit coupling said charging circuit with said control terminal of said second switching device, said control circuit responsive to the direction of current flow in said charging circuit and operative to supply a turn on current to said second switching device at the instant that said capacitor is completely charged by said inductor.

2. An ignition system for an internal combustion engine comprising, an ignition coil having a primary winding and a secondary winding, breaker contacts opened and closed in synchronism with operation of said engine, an inductor, means connecting said inductor and said breaker contacts in series across said source of direct current whereby said breaker contacts open and close the circuit for said inductor, a capacitor, a charging circuit connecting said inductor and said capacitor for transferring energy from said inductor to said capacitor when said breaker contacts open, a switching device having a pair of current carrying terminals and a control terminal, means connecting the current carrying terminals of said switching device and said capacitor in series with said primary winding whereby said capacitor discharges into said primary winding through said switching device when said switching device is biased conductive and means coupling said charging circuit and the control terminal of said control device such that said control device is biased conductive from said charging circuit when said capacitor becomes fully charged from said inductor and responsive to a reversal in current flow in said charging circuit.

3. An ignition system for an internal combustion engine comprising, an ignition coil having a primary winding and a secondary winding, said secondary winding being adapted to be connected with a spark plug, a source of voltage, an inductor, a switching device connecting said inductor in series with said source of voltage whereby said source of voltage and inductor are periodically connected and disconnected, a capacitor, a charging ciruit connecting said inductor and said capacitor operative to transfer energy from said inductor to said capacitor whenever said switching means is open, a controlled rectifier having an anode, cathode and gate, means connecting the anode-cathode circuit of said controlled rectifier in series with said capacitor and said primary winding of said ignition coil whereby said capacitor discharges into said primary winding through the anode-cathode circuit of said controlled rectifier when said controlled rectifier is gated conductive and means connecting the gate of said controlled rectifier to a point on said charging circuit, said capacitor providing gate current to turn on said controlled rectifier via said charging circuit when said inductor has completely transferred its energy to said capacitor.

4. An ignition system for an internal combustion engine comprising, an ignition coil having a primary winding and a secondary winding, said secondary winding being adapted to be connected with a spark plug for said engine, a source of direct current, an inductor, a first switching device, means connecting said inductor and said first switching device in series across said source of direct current, a second switching device having a pair of current carrying terminals and a control terminal, said second switching device being biased conductive between its current carrying terminals when a bias current is applied to its control terminal, a capacitor, a charging circuit connecting said inductor and said capacitor, said charging circuit operative to transfer energy from said inductor to said capacitor when said first switching means opens, a circuit for discharging said capacitor through said primary winding of said ignition coil including the current carrying terminals of said second switching device, and means connecting the control terminal of said second switching device with said charging circuit for said capacitor whereby said second switching device is biased conductive by control current developed in said capacitor charging circuit at a point of time where said capacitor becomes completely charged from said inductor, the current carrying terminals of said second switching device being connected in parallel with said first switching device and in series with said inductor whereby said inductor can receive current from said source of direct current prior to a reclosing of said first switching device.

5. An ignition system for an internal combustion engine comprising, an ignition coil having a primary winding and a secondary winding, a source of direct current, a transformer having a primary winding and a secondary winding, a first switching device connected in series with the primary of said transformer and in series with said source of direct current, a second switching device having a pair of current carrying terminals and a contol terminal, said second switching device biased conductive by current applied to its control terminal, a first capacitor, a charging circuit connecting said primary winding of said transformer and said first capacitor for transferring energy from said primary winding to said first capacitor when said first switching means opens, a discharging circuit for discharging said first capacitor into the primary winding of said ignition coil including the current carrying terminals of said second switching device, means coupling the control terminal of said second switching device to said charging circuit for said first capacitor whereby said second switching device is biased conductive at a point when said first capacitor becomes fully charged from said inductor, a circuit connecting said secondary winding of said transformer and said secondary winding of said ignition coil including a diode, and a second capacitor connected between said last named circuit and one end of said primary winding of said transformer, said second capacitor discharging through said secondary winding of said ignition coil when said first capacitor discharges.

References Cited

UNITED STATES PATENTS

| 3,184,653 | 5/1965 | Hutson | 123—148 X |
| 3,291,110 | 12/1966 | Peters | 123—148 |
| 3,297,911 | 1/1967 | Quinn | 315—209 |

LAURENCE M. GOODRIDGE, *Primary Examiner.*